Jan. 29, 1952   M. B. STILPHEN   2,584,061
COOKING DEVICE
Filed Oct. 23, 1947   2 SHEETS—SHEET 1
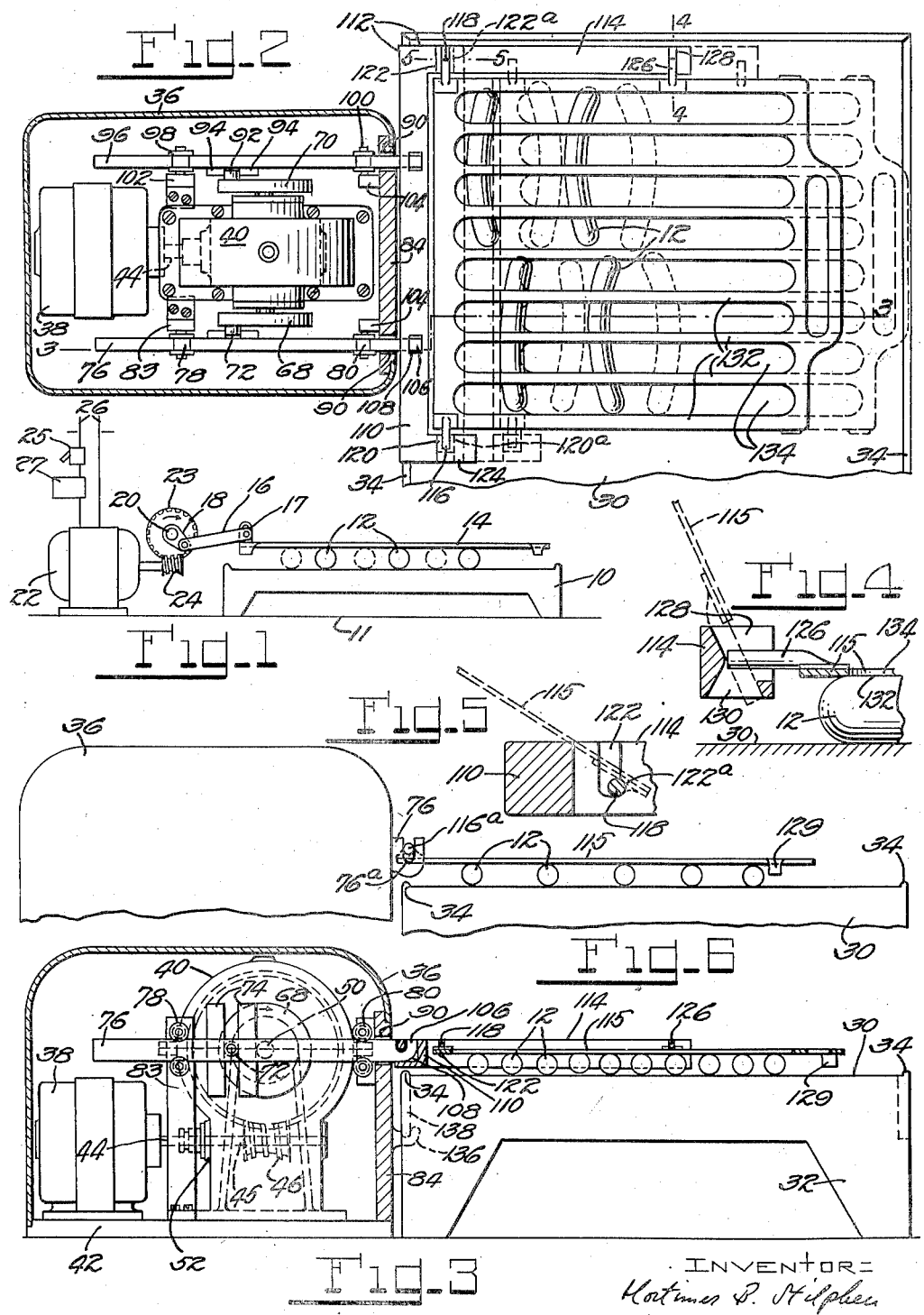
INVENTOR:
Mortimer B. Stilphen
by Dike, Calver + Porter
ATTYS.

Jan. 29, 1952 M. B. STILPHEN 2,584,061
COOKING DEVICE
Filed Oct. 23, 1947 2 SHEETS—SHEET 2
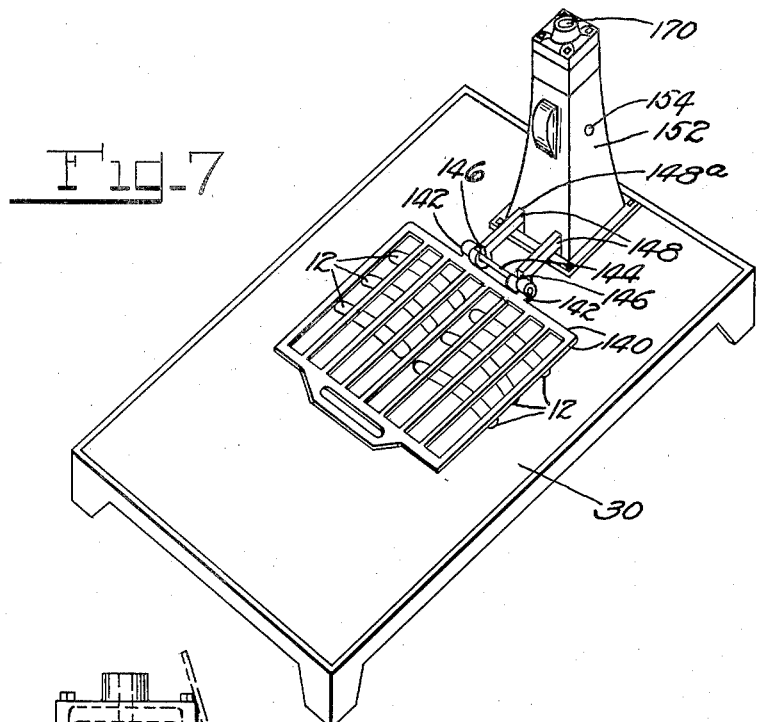
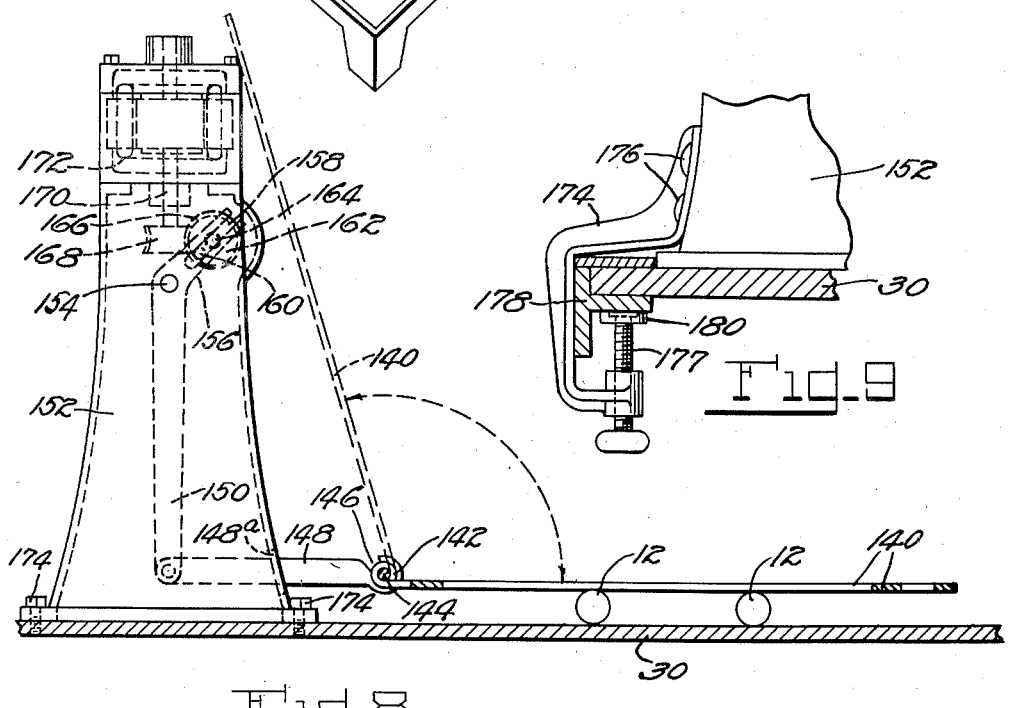
INVENTOR:
Mortimer B. Stilphen
by Dike, Calver + Porter
Attys.

Patented Jan. 29, 1952

2,584,061

UNITED STATES PATENT OFFICE 2,584,061

COOKING DEVICE

Mortimer B. Stilphen, Haverhill, Mass.

Application October 23, 1947, Serial No. 781,571

1 Claim. (Cl. 99—423)

The present invention relates to cooking devices and particularly to devices for cooking foods in cylindrical form or such form that they can be rolled in contact with a supporting surface. Such foods are frankfurters, sausages, and the like; and this invention has particular reference to improvements in appliances for cooking frankfurters.

The frankfurter is a popular luncheon food served at wayside eating places and is most commonly cooked by toasting or broiling in contact with a hot plate. The frankfurter should be turned over on the plate during the cooking process to prevent the overcooking or charring of the parts of the frankfurter that are closest to the plate and also to insure more uniform cooking throughout. The attendant usually has many duties additional to frankfurter cooking and hence improperly cooked frankfurters are quite commonly served, whereas a uniform high standard of excellence is obviously desirable to insure satisfaction and repeat business.

One object of the present invention is the provision of power operated mechanism for automatically shifting the contact zone of the frankfurter or similar food article, with the hot plate and particularly by rolling the frankfurter over and in contact with the hot plate during the cooking thereof in such manner as to provide for the uniform cooking of the frankfurter and freedom from overcooked or charred localities.

Since the hot plate on which frankfurters are commonly cooked at many eating places is also used for general cooking purposes, it is a further object of this invention to provide the power-operated frankfurter rolling device for use as an accessory in connection with such a plate and so arranged that it need not interfere with the use of practically the full cooking area of the plate when needed for other than frankfurter cooking purposes.

A more specific object of the invention is the provision of frankfurter rolling mechanism including a power operated movable member adapted to bear upon a frankfurter, or a row of parallel frankfurters, on a hot plate, with sufficient pressure so that when the member is moved crosswise of the length of the frankfurter, or lengthwise of the row, the frankfurter will be rolled upon and in contact with the plate, the amount of rolling movement being preferably such as to rotate the frankfurter about a complete revolution. More than a complete revolution is not objectionable and the amount of roll should be sufficient to uniformly cook the frankfurter, and the rolling movement should not be arrested for sufficient time to cause the overcooking or burning of any part of the frankfurter.

A yet further object of the invention is in the provision of power driven mechanism wherein the frankfurter rolling member is so arranged that cooked frankfurters can be removed and uncooked frankfurters introduced readily between the member and the hot plate.

Another object of the invention is the provision of a frankfurter rolling member that is hinged to the power-actuating mechanism so that it is capable of swinging from an operating position upon the frankfurters to an unoperated position above the hot plate, either for the purpose of changing frankfurters or for utilizing the plate for other cooking purposes.

A yet further object of the invention is the provision of automatically operative mechanism for rolling the frankfurters back and forth on the hot plate during the process of cooking them.

A further object of the invention is to improve upon cooking devices.

With the above and other objects and features in view, the invention will be described with reference to the accompanying drawings in which:

Fig. 1 is a diagrammatic view in side elevation illustrating the principles of the present invention;

Fig. 2 is a plan view partly in section illustrating a preferred embodiment of the invention;

Fig. 3 is a view in side elevation taken along the line 3—3 of Fig. 2;

Fig. 4 is a view in section taken along the line 4—4 of Fig. 2;

Fig. 5 is a view in cross-section taken along the line 5—5 of Fig. 2;

Fig. 6 is a fragmentary view in side elevation illustrating a modified construction for connecting the reciprocating plate or grid to the reciprocating mechanism;

Fig. 7 is a perspective view of a still further modification;

Fig. 8 is a view in side elevation of the modification shown in Fig. 7; and

Fig. 9 is a fragmentary view, partly in section, illustrating a construction for securing the device shown in Figs. 7 and 8 to a heated plate.

The principle of the invention is illustrated in Fig. 1 in connection with the hot plate 10, which can be the usual hot plate used in eating places and which is heated commonly by underlying gas flames or by electrical heating units, although the source of heat for the plate is not herein important. The plate is commonly mounted upon a bench or table 11 which also provides the support for the power-actuated mechanism of the present invention.

Frankfurters, sausages or like cylindrical food articles 12 are placed upon the top of the heated plate in parallel relation in a row. A frankfurter turning or rolling member, as a horizontal grid or plate 14 is provided which, when in use, is adapted to rest upon the frankfurters of the row and is sufficiently heavy to cause the frankfurters to roll upon and over the heated plate when the grid is advanced crosswise of the length of the frankfurters. The grid preferably is advanced and then retracted, the reciprocation being effected through a link 16 having at one end a pivotal connection 17 with the grid and at the other end a connection with a crank 18 fixed to a rotatable shaft 20. Said shaft is driven at suitable speed from an electric motor 22 through speed reducing mechanism herein including a worm gear 23 fixed to the shaft 20 and a worm 24 fixed to the motor shaft. The rate of reciprocation of the grid can be anything desired for the purpose. A satisfactory speed is from four to fifteen complete reciprocations per minute. The length of the stroke is preferably such as to rotate the frankfurter about a complete revolution so as to bring all of the circumference in contact with the hot plate. A longer stroke is not objectionable. A shorter stroke is not harmful provided it is sufficiently long to insure good cooking of the frankfurters. Frankfurters vary in diameter and hence the larger diameter frankfurters require a greater length of stroke for a complete revolution. While the length of stroke can be made adjustable in a well known manner not necessary to illustrate, it is preferred, for simplicity, to have a fixed stroke that is suitable for all diameters of frankfurters common at the present time.

The reciprocating grid thus rolls the frankfurters first in one and then in the opposite direction in contact with the hot plate, the frankfurters being practically continuously in motion so that there is no opportunity for any part thereof to become cooked differently from any other part thereof.

The reciprocatory movement can be started and stopped by an attendant, by operating the manual switch 25 in the electric circuit 26 of the motor 22 or the length of the reciprocating period can be controlled by the automatically-operative timing switch 27, the stopping of the mechanism being sufficient warning to the attendant of the properly cooked condition of the frankfurters. The cooked frankfurters can be removed by tilting the grid 14 upwardly about its pivotal connection 17 with the connecting rod 16. Such connection 17 can be in the nature of a pin and slot connection, or the like, to insure that the grid rests freely upon the underlying frankfurters.

The preferred embodiment of the invention shown in Fig. 2 includes a heated plate 30 of suitable dimensions mounted on legs 32 which support the plate above the supporting bench in order to provide adequate space therebelow for the heating means on the plate. The plate 30 is provided, as shown most clearly in Fig. 3, with a raised rim or edge 34 which prevents grease or the like from running off the top surface of the plate. Mounted beside the heated plate 30 is an enclosing casing 36 containing an electric motor 38 and a speed reducing mechanism 40 fixed on a base 42, which forms the bottom closure of the enclosing casing. The motor shaft 44 drives a high speed shaft 45 of the speed reducing mechanism, which shaft has a worm 46 fixed thereto meshing with a worm gear fixed to a slow speed shaft 50. Both shafts are suitably journalled in the enclosing casing 52 of the reducing mechanism.

The disc 68 is provided with a crank pin 72 which is movable in a vertical slot or space between a pair of horizontally-spaced vertical bars 74 fixed to a horizontal slide bar 76 as by welding or otherwise. The width of the slot is about equal to the diameter of the crank pin 72. Thus when the disc rotates the crank pin causes horizontal reciprocation of the slide bar. Said slide bar is guided for horizontal reciprocation between roller sets 78 and 80, the rollers 78 being rotatably mounted on an upstanding bracket 83 of the base 42 and the rollers 80 being rotatably mounted on an upstanding side plate 84 of the base 42, which plate forms a part of a side of the enclosing casing. Said plate 84 has a slot 90 through which the forward end portion of the slide bar 76 is reciprocable.

The disc 70 is provided with a crank pin 92 which is similar to the crank pin 72 and is mounted in a slot between two vertical bars 94 fixed by welding or other suitable means to a horizontal slide bar 96. The slide 96 reciprocates between pairs of rollers 98, 100 which are mounted respectively on a vertical bracket 102 and bosses 104 formed on the front plate 84. This construction is substantially identical with the construction on the other side of the reduction gearing casing and need not be further described herein. The crank pins 72 and 92 are in axial line and hence the slide bars 76 and 96 are reciprocated in unison.

The forward projecting ends of the slide bars are provided with hooks 106 that are removably located in openings 108 formed in one arm 110 of an L-shaped supporting member 112 having a right-angularly related arm 114, the arrangement of the hooks and openings being such as to support the member 112 parallel with the heated plate 30 and also permitting the member to be detached from the hooks upon swinging the member sufficiently into a vertical position. A frankfurter-rolling member or grid 115 is located between the arms 110, 114 and is carried removably and swingably thereby in such manner that the grid can be swung upwardly at will about either arm 110 or 114. To this end said grid is provided with a pair of oppositely outstanding aligned pins 116, 118 parallel with the arm 110 and arranged in vertical slots 120, 122, one in the arm 114 and the other in a forward projection 124 of the arm 110 and a third pin 126 parallel with the pin 118 and located in a slot 128 of the arm 114. Thus the grid can tilt about the pins 116, 118, or about the pins 118, 126 into an elevated or somewhat rearwardly inclined rearward position to clear the surface of the hot plate for the introduction of the frankfurters to and their removal from the plate. By being pivoted in two right-angularly related planes, the device can be positioned either over the long side or the short side of the plate and suitably operated by an attendant.

The slots permit vertical displacement of the grid to accommodate at different times frankfurters of different diameters thereunder, the weight of the grid being taken by the underlying frankfurters. When there are no frankfurters on the plate, legs 129 depending from the forward part of the grid and somewhat shorter than the diameter of the smallest-diameter frankfurters used, support the body of the grid above the plate.

The slots 120, 122 are formed with offset extensions 120a, 122a which hold the grid-pins from coming out of the slots when the grid is tilted rearwardly against the arm 110 as illustrated in Fig. 5. The slots 122, 128 are further formed with bottom openings 130, see Fig. 4, the side of which hold the grid in rearwardly inclined position when tilted about the arm 114.

The grid is preferably sufficiently heavy, as by being formed of relatively thick sheet metal, so that its weight presses it sufficiently firmly against the underlying frankfurters to roll them surely first in one and then in the opposite direction upon the hot plate when the grid is rotated. The weight of the grid is supported by the frankfurters. The supporting member 112 has only to move and guide the grid and guide it in its reciprocating movement when the device is operating.

The depth of the slots 120, 122, 128 are such that the vertical position of the grid can vary in accordance with the diameter of the frankfurters thereunder at different times without the grid becoming detached from the supporting member or being supported in deleterious part thereby.

Preferably the grid is formed with a plurality of horizontally spaced bars 132 with intervening openings 134, the lengths of the bars being disposed crosswise of the lengths of the underlying frankfurters.

While the device as above described can be secured to the table and beside the hot plate it may be convenient at times to rest the device upon the table and to secure it to the hot plate against relative movement with respect thereto. To this end the casing of the device may have a hook 136 which is merely hooked under a side bar 138 of the hot plate as illustrated in Fig. 3.

In Fig. 6 there is disclosed a different embodiment of the invention. In this construction, the supporting member 110 is eliminated and the grid or plate 115 is connected directly to the forward ends of the slides 76 which are provided with relatively deep vertical slots 76a for receiving the pins 114a and 116a. With this construction, the plate is reciprocated to rotate or turn the frankfurters or sausages. The grid is capable of pivotal movement only in one direction or in the slots 76a.

The construction illustrated in Figs. 7 and 8 is provided with a grid 140 which is substantially the same as the grid of Figs. 2 and 3. As illustrated, the grid or plate 140, is provided with rearwardly extending projections 142 which encircle a hinge rod 144. Said rod 144 is received in substantially vertical slots 146 formed in the forward ends of slide members 148 which are arranged to be reciprocated to impart rolling or rotating movement to the frankfurters 12 supported on the heated plate 30. As shown best in Fig. 8, the grid or plate 140 is arranged to be rotated about the rod or pin 144 into the dotted line position shown in Fig. 8, thus moving the grid 140 into a position away from the plate 30.

The slides 148 are reciprocated by mechanism which will now be described. The rear end portion of each of the slides 148 is pivotally connected to the lower end of a lever arm 150, shown in dotted lines in Fig. 8, which lever arm 150 is pivoted to an enclosing casing 152 by a pin 154. The upper end of the lever 150 is provided with an upwardly and forwardly extending arm 156 which is provided with a slot 158 for receiving a crank pin 160. The crank pin 160 is fixed to a disc 162 fixed to one end of a shaft 164 which is journalled in suitable bearings in the enclosing casing 152. The shaft 164 has fixed thereto a worm gear 166 which meshes with a worm 168 fixed to the lower end of the vertically extending motor shaft 170. Thus, when the motor 172 is energized rotation of the worm gear 168 will be imparted to its meshing gear 166, thus rotating the disc 162. The crank pin 160 in the slot 158 will cause reciprocation of the lever 150 and hence reciprocation of the slides 148 connected thereto.

The construction illustrated in Figs. 7 and 8 is designed particularly for use where space is limited and wherein the heated plate 30 is of sufficient size to support the housing 154 and the parts contained therein. Preferably, the enclosing housing 154 is fixed to the heated plate 30 by means of suitable screws or bolts 174.

The slides 148 extend through slots 148a in the side wall of the casing 152, the slots being vertically elongated so that they clear the slides when frankfurters are under the grid to permit the full weight of the grid to bear upon the frankfurters.

The construction shown in Fig. 9 discloses a means for detachably securing the casing 152 to the plate 30 and includes a clamping bracket 174 fixed to the side wall of the casing 152 by suitable fastenings 176, such as rivets. The clamping bracket 174 at its lower end is provided with a vertically extending threaded opening for receiving a clamping screw 177 which is arranged to bear on the lower surface of the heated plate 30 or as illustrated against a trimming panel 178. Thus, when the clamping screw 177 is threaded upwardly the upper end of the plate 180 on the screw 176 engages the lower edge portion of the panel trim 178 and clamps the casing 154 in position on the heated plate 30.

The term "sausages" or "frankfurters," as used herein, is merely illustrative since it is evident that the present invention may be used for cooking, roasting, broiling or grilling other cylindrical edible objects.

Having thus described my invention, what I claim as new and desire to secure by Letters Patent of the United States is:

Apparatus for cooking frankfurters and the like, in combination, a hot plate, a device for turning the frankfurters on said hot plate during cooking comprising a grid member mounted for reciprocal movement above said plate and resting upon the frankfurters on said plate, an L-shaped support to which said grid member is pivotally connected for pivotal movement upwardly in two directions, and means including an electric motor, rotating crank and reciprocating slide bar for reciprocating said grid member.

MORTIMER B. STILPHEN.

REFERENCES CITED

The following references are of record in the file of this patent:

UNITED STATES PATENTS

| Number | Name | Date |
|---|---|---|
| 445,349 | Bausch | Jan. 27, 1891 |
| 669,432 | Winburn | Mar. 5, 1901 |
| 1,072,564 | Bowers | Sept. 9, 1913 |
| 1,119,792 | Biesmeyer | Dec. 8, 1914 |
| 1,795,828 | Brand | Mar. 10, 1931 |
| 1,809,004 | Vierling et al. | June 9, 1931 |
| 1,948,870 | Pointon et al. | Feb. 27, 1934 |
| 1,988,087 | Peron | Jan. 15, 1935 |
| 2,015,358 | Broduist | Sept. 24, 1935 |
| 2,185,979 | Dumas | Jan. 2, 1940 |
| 2,199,266 | Maier | Apr. 30, 1940 |
| 2,244,670 | Benedict | June 10, 1941 |
| 2,431,073 | Palmer | Nov. 18, 1947 |

FOREIGN PATENTS

| Number | Country | Date |
|---|---|---|
| 354,915 | France | Aug. 11, 1905 |